US007805676B2

(12) United States Patent
Schemers et al.

(10) Patent No.: US 7,805,676 B2
(45) Date of Patent: Sep. 28, 2010

(54) ENHANCED CALENDARING FUNCTIONALITY IN A COLLABORATION SUITE

(75) Inventors: Roland J. Schemers, Emerald Hills, CA (US); Ross Dargahi, Mountain View, CA (US); Timothy W. Brennan, San Francisco, CA (US); Jiho Hahm, Sunnyvale, CA (US); Daniel Geoffrey Karp, Berkeley, CA (US); James Andrew Clark, Sunnyvale, CA (US); Matthew Owen Williams, Oakland, CA (US)

(73) Assignee: VMware, Inc., Palo Alto, CA (US)

( * ) Notice: Subject to any disclaimer, the term of this patent is extended or adjusted under 35 U.S.C. 154(b) by 626 days.

(21) Appl. No.: 11/638,941

(22) Filed: Dec. 14, 2006

(65) Prior Publication Data

US 2009/0100347 A1 Apr. 16, 2009

Related U.S. Application Data

(60) Provisional application No. 60/752,792, filed on Dec. 21, 2005.

(51) Int. Cl.
 *G06F 13/00* (2006.01)
 *G06F 15/00* (2006.01)
(52) U.S. Cl. ....................... 715/711; 715/737
(58) Field of Classification Search ................ 715/711, 715/737, 731–733, 783–789, 810, 708, 739, 715/742, 843–845, 764, 778, 825
 See application file for complete search history.

(56) References Cited

U.S. PATENT DOCUMENTS

| 6,369,840 | B1 * | 4/2002 | Barnett et al. ............... 715/853 |
| 7,003,735 | B2 * | 2/2006 | Edlund et al. ............... 715/810 |
| 7,263,667 | B1 * | 8/2007 | Hoellerer et al. ............ 715/782 |

OTHER PUBLICATIONS

Gordon Padwic, Using Microsoft OutLook 98, 1998.*
"Quick Guide for Calendar", for Lotus Notes 6, 2002, 4 pages, www.wareSource.com.
Nagendra Nyamgondalu, "Lotus Notes Calendar and Scheduling explained!", Part I, Oct. 18, 2004, 12 pages, http://www.ibm.com/developerworks/lotus/library/cs-pt1/.

* cited by examiner

*Primary Examiner*—Kevin Nguyen

(57) ABSTRACT

Various embodiments of the present invention provide for enhanced calendaring functionality in a collaboration suite application. A mini-calendar display in different views of the collaboration suite application provide for an easy way to view, edit and/or add appointments without needing to open of the calendar in the collaboration suite application. Email messages can be dragged onto days in the mini-calendar to create meeting proposals. Enhanced UI allows for different meetings being having different appearances based on whether they have been accepted, rejected, etc. Multiple calendars can be viewed simultaneously and their cumulative availability for any time slot can be easily seen via a calendar thermometer. Requests for sharing of calendars can be communicated via email messages, and they can be seamlessly responded to within the email message itself.

7 Claims, 19 Drawing Sheets

ENHANCED CALENDARING FUNCTIONALITY IN A COLLABORATION SUITE

CROSS-REFERENCES TO RELATED APPLICATIONS

This application claims the benefit of, and priority under 35 USC §119(e) to, co-pending provisional application No. 60/752,792, which is entitled "New Calendaring Functionality in a Collaboration Suite" and which was filed on Dec. 21, 2005. This application is hereby incorporated herein in its entirety.

This application is related to co-pending U.S. application Ser. No. 11/503,810, which is entitled "System and Method for Seamlessly Integrating Separate Information Systems within a Collaboration Suite Application" and which was filed on Aug. 14, 2006. This application is hereby incorporated herein in its entirety.

BACKGROUND OF THE INVENTION

1. Field of the Invention

This invention relates generally to a collaboration suite application, and more particularly, to allowing a user to more effectively and efficiently use a calendaring application.

2. Description of the Related Art

Collaboration suite applications typically include functionality such as email messaging, calendaring, and contact storage and retrieval, where email messages, calendar appointments, contacts, etc. are commonly referred to as "mailbox items." The Zimbra Collaboration Suite from Zimbra, Inc. (San Mateo, Calif.), Microsoft Exchange and Microsoft Outlook from Microsoft Corp. (Redmond, Wash.), and Lotus Notes from IBM (Armonk, N.Y.) are examples of collaboration suite applications. Web based collaboration suites, such as those from Yahoo (Sunnyvale, Calif.), and Google (Mountain View, Calif.) are also becoming increasingly popular.

The importance of calendaring applications in collaboration suites has risen over the last several years, as they have increasingly replaced traditional paper and pen calendars and/or appointment diaries. Not only are such calendaring applications paperless, but their usefulness is further enhanced by of their interaction with other aspects of collaboration suites, such as email. For instance, invitations for meetings can be emailed to invitees, and their responses (e.g., acceptances, rejections etc.) can be stored within the corresponding calendar event. Moreover, it is often possible within an organization to check the schedules of invitees in a meeting in order to determine a suitable meeting time. In some collaboration suite applications, it is even possible to see the calendars of various invitees in a meeting simultaneously, so that available times for scheduling a meeting can be easily determined. It is possible, in several collaboration suite applications, to view shared calendars side by side.

There are, however, several potentially useful features relating to calendaring that have not been conventionally implemented in conventional collaboration suite clients & servers, especially those which include seamless interaction of the calendaring application with other applications. Consider an example—if a user is viewing his email, and wants to schedule a meeting, conventionally the user would have to open the calendaring application within the collaboration suite before he can do so. Then the user would need to return to the email application in order to continue viewing his emails. It is also not possible to simply drag an email to a specific date on the calendar, and have useful interactions (e.g., creating a meeting proposal for that day, with the invitees being the recipients of the email). Furthermore, date objects in email with calendaring functionality are not traditionally available. For instance, it is not traditionally possible to have date-related words (e.g., today, tomorrow, and yesterday) in emails to be associated with specific dates (e.g., based on the send date of the email).

Several other added functionality enhancements are possible, such as easier sharing of calendars within an organization, as well as sharing of calendars outside of an organization, easier scheduling of meetings, better UIs to view meetings with different statuses (e.g., accepted, rejected, tentatively accepted, etc.) on a calendar, and so on, to mention just a few.

Thus there is a need for a method and system for seamlessly integrating various elements of a collaboration suite application with the calendaring application. Furthermore, there is a need for a method and system which provides such integration within a web-based collaboration suite application. Moreover, there is a need for enhanced UI for various functionalities available in a calendaring application.

BRIEF SUMMARY OF THE INVENTION

The various embodiments of this invention provide for enhanced calendaring functionality, and a seamless and easy integration of the calendaring element with other elements of a collaboration suite.

In one embodiment, a mini-calendar display allows viewing, editing and adding of appointments from various applications within the collaboration suite application, without the user's having to open the calendar application. Also, dragging mailbox items to the mini-calendar can result in specific actions (e.g., dragging an email to a day in the mini-calendar can create a meeting invitation for that particular day, addressed to the people in the email.)

In one embodiment, date related alphanumeric characters (e.g., today, tomorrow, Jan. 1, etc.) can be recognized as date content objects, often based on the context (e.g., the date the email was sent, in which "tomorrow" was included). Specific interactions with such date content objects are allowed. For instance, a date content object can be hovered over to see appointments for that day, or right-clicked on to created new appointments in the relevant day.

In one embodiment, different meetings/appointments have different appearances, based up on their status. For example, rejected meetings are still on the calendar, but are barely visible. In one embodiment, multiple calendars (some of which may belong to different users) can be seen simultaneously. A calendar thermometer can be seen adjacent to these multiple calendars, where the calendar thermometer indicates the combined availability of any time slot across these multiple calendars. In one embodiment, the calendar thermometer depicts different timeslots in different colors, based upon the combined availability of the time slot; For instance, a time slot which is busy in all the calendars may appear in a dark color (e.g., red), a time slot which is busy in some of the calendars may appear in a lighter color (e.g., pink) and a time slot which is available in all the calendars may appear in an even lighter color (e.g., white). This facilitates scheduling of meetings etc. to coordinate with the multiple calendars visible.

In one embodiment, calendars can be shared with seamlessly and easily via email. In one embodiment, the sharee can respond to the request easily within the email itself. Moreover, in one embodiment, sharing of calendars is based on sending the sharee a URL. In one embodiment, a .ics file is sent to the sharee, which the sharee can download on his machine. In another embodiment, the shared calendar is simply visible within the browser itself, without any downloading. In one such embodiment, the caldav protocol supports such functionality.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

FIG. 1C is a screen shot which shows a mini-calendar displayed when the calendar is in the main view, in accordance with an embodiment of the present invention.

FIG. 9C is a screen shot which shows a calendar list with multiple calendars selected, in accordance with an embodiment of the present invention.

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. Moreover, some examples are described with respect to the Zimbra Collaboration Suite from Zimbra Inc. (San Mateo, Calif.) who is the assignee of this patent application, but the invention is in no way limited to the Zimbra Collaboration Suite.

A collaboration suite application generally consists of various applications or sub-applications or elements such as emailing, contacts, and calendaring. Other elements such as tasks, memos, instant messaging, and document sharing are also sometimes included in a collaboration suite application. Various embodiments of the present invention relate to enhanced functionality for the calendaring application in a collaboration suite application, and also to seamless integration of the calendaring element with the other elements in a collaboration suite application.

Miniature Calendar with Display and Edit Functionality:

In accordance with one aspect of the invention, a miniature calendar is displayed within the user interface of the collaboration suite application. Such a miniature calendar 110 can be seen in FIGS. 1A, 1B and 1C. The miniature calendar is associated with functions that enable the user to view, create, and edit appointments without having to open up his calendar in the collaboration suite application.

Figure 1A:
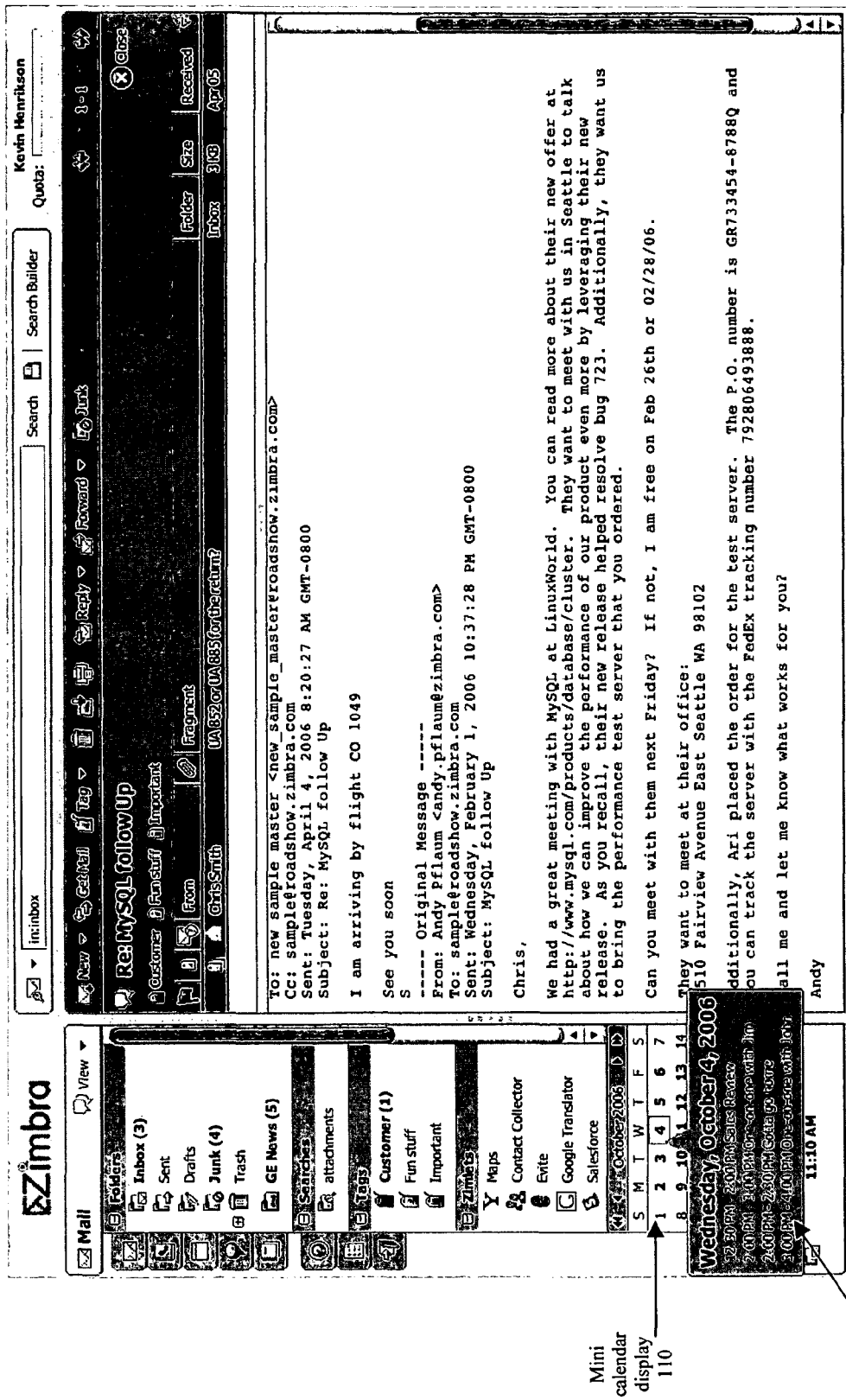
FIG. 1A is a screen shot which shows a mini-calendar displayed when an email is in the main view, in accordance with an embodiment of the present invention.
Figure 1B:
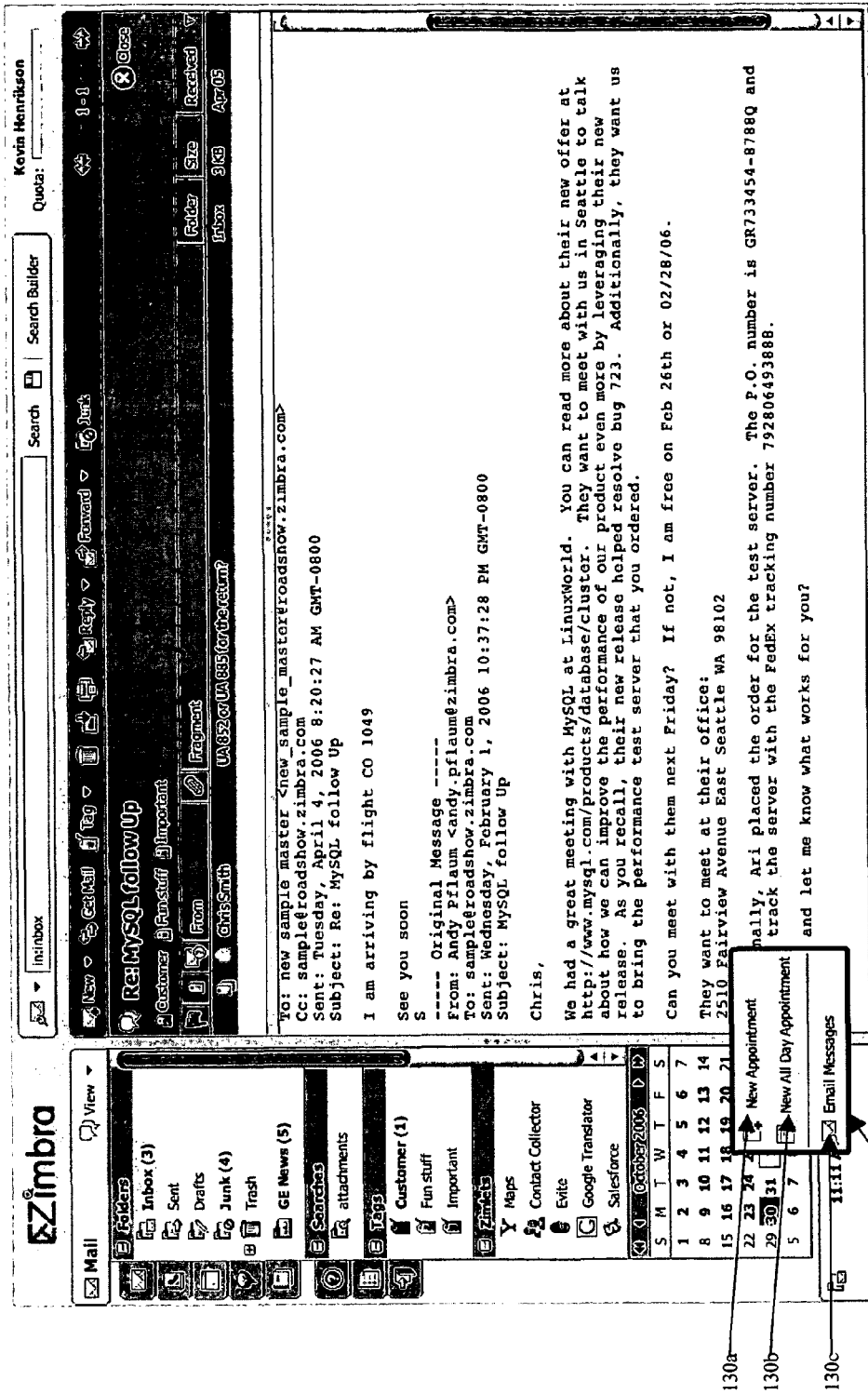
FIG. 1B is a screen shot which shows a context menu for a specific date in the mini-calendar, in accordance with an embodiment of the present invention.
Figure 1C:
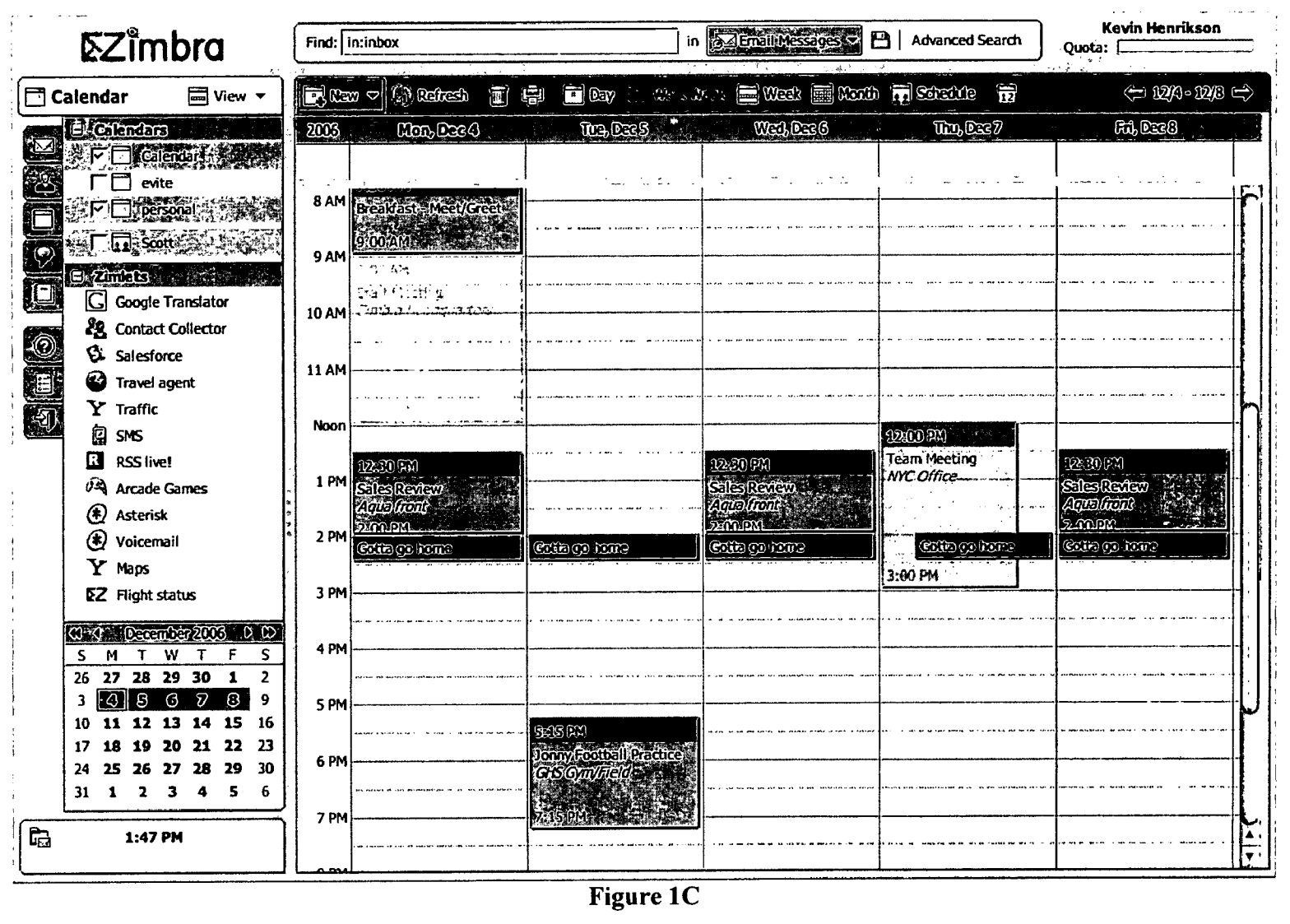

The miniature calendar display 110 can appear in views of various elements of a collaboration suite application. (e.g., email view, calendar view, contact view, etc.). In FIGS. 1A and 1B, the miniature calendar display 110 is visible in the email view. When the user is utilizing features of such other elements of the collaboration suite (e.g., reading emails in the email view), he can seamlessly view, create and/or edit appointments etc. using the mini calendar display 110. In FIG. 1C, the mini calendar display 110 is visible in the calendar view itself. Even when the user is within the calendar application itself, the miniature calendar display 110 is still useful for viewing, editing and/or creating appointments etc. for other days not currently displayed in the calendar view.

While FIGS. 1A, 1B and 1C show the mini-calendar having a one-month display, any other time periods (e.g., one week) can be used in accordance with various embodiments of the invention.

In one embodiment, a user can interact with the mini-calendar in several different ways. For instance, in one embodiment, when a user "mouses over" (i.e. the cursor hovers over) a date in the mini-calendar display 110, a small window or tool-tip 120 appears, which displays the existing appointments in the calendar application for that date, as can be seen in FIG. 1A. It is to be noted that the appointments seen here upon hovering over a day in the mini calendar can be from a single calendar or from multiple different personal and/or shared calendars. More generally, any type of interaction with the mini-calendar display 110 can result in viewing, editing, and/or adding information in one or more personal and/or shared calendars. In another embodiment, a user can interact with the mini calendar display 110 by clicking a button of an input device (e.g., clicking the right button of a mouse). In one embodiment, a right click may open up a context menu for that date. Such a context menu 130 is seen in FIG. 1B. In the embodiment shown in FIG. 1B, the context menu 130 allows the user to add a new appointment 130a for a specific day, to add a new all day appointment 130b for a specific day. Thus a user can view and make appointments without having to open up or switch to the calendar view in his collaboration suite application. (When the user in already in the calendar view as in FIG. 1C, he can still use the mini-calendar display 110 by interacting with it (e.g., mousing or hovering over it, right clicking on it, etc.) to view and make appointments for a specific day without opening up that day in his calendar). For instance, if the user receives an email with a request for an appointment, the user can check his availability, and/or add the appointment to his calendar without having to open up his calendar in the collaboration suite application.

Figure 2:
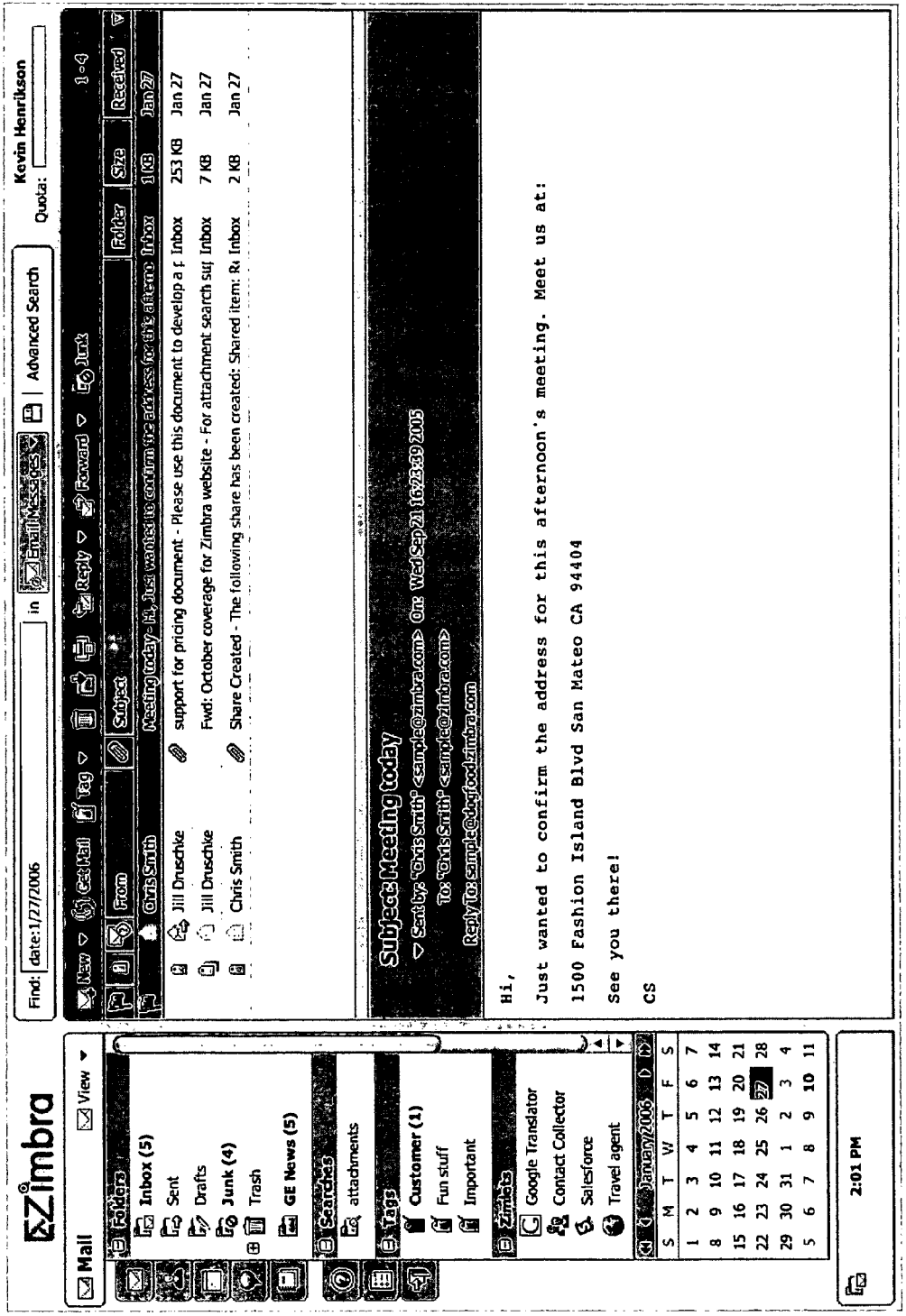
FIG. 2 is a screen shot which shows search results for emails received on a specific date, in accordance with an embodiment of the present invention.

Referring to context menu item 130c, it can be seen that in one embodiment the user can use the context menu 130 to search for emails associated with a specific day. In one embodiment, this search is for emails received on the specified day. FIG. 2 is a screen shot of such search results. In one embodiment, this search is for emails sent on the specified day. In another embodiment, the search includes both emails sent on, and received on, a particular day. In one embodiment, the user can configure the parameters of the searching of emails.

Figure 3A:
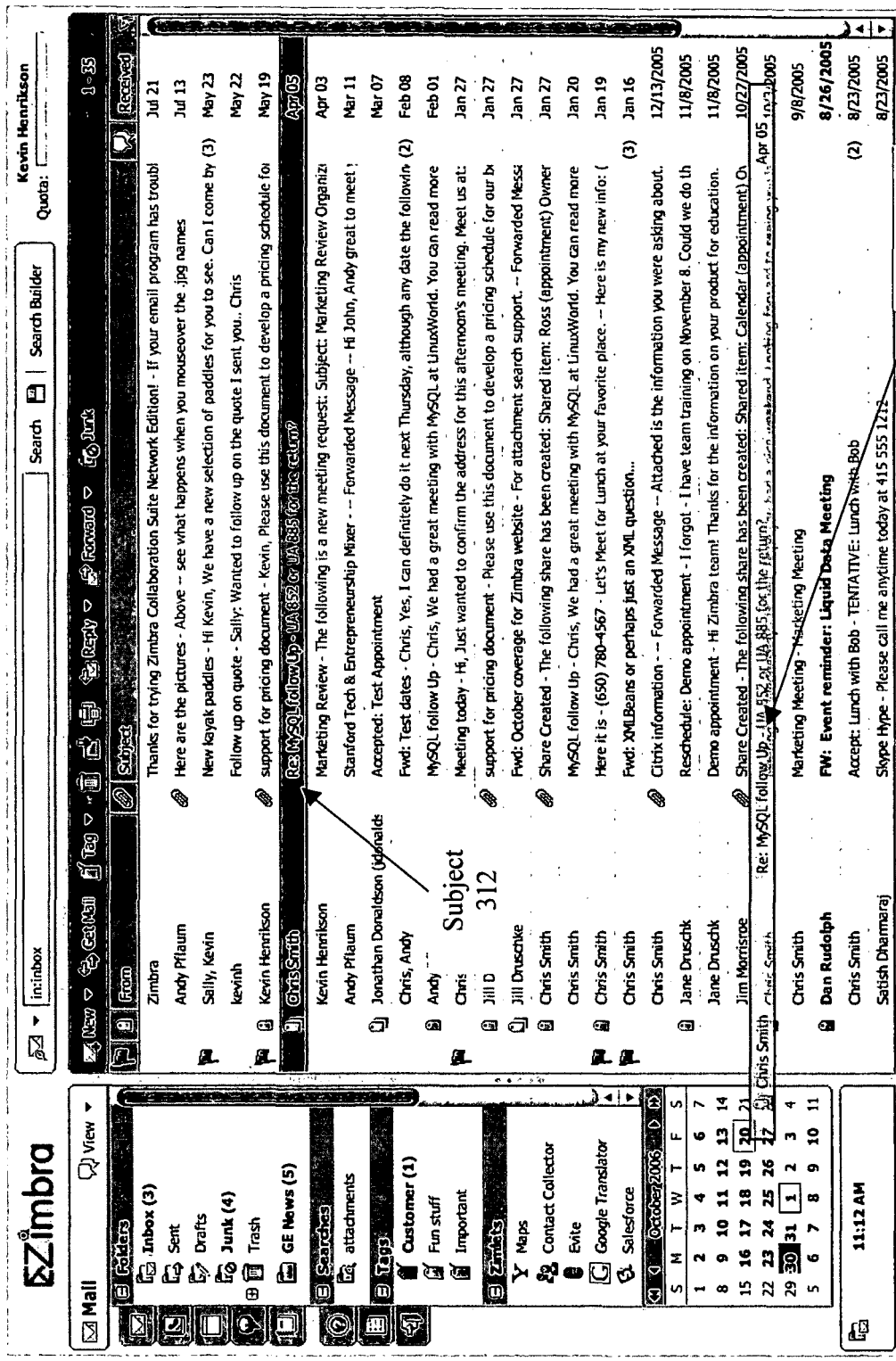
FIG. 3A is a screen shot which shows an email being dragged to a specific date in the mini-calendar, in accordance with an embodiment of the present invention.

In one embodiment, a possible interaction with the mini-calendar display 110 includes dragging an email and dropping it on to a specific day in the mini-calendar. This can be seen in FIG. 3A, where an email 310 is being dragged on to the mini-calendar display 110.

In one embodiment, the mini-calendar display 110 is treated as a panel item. The user may interact with panel items by dragging mailbox items (e.g., email messages, contacts and calendar appointments) onto them, double clicking them, and invoking actions from a context menu if one is available. Panel items are described in further detail in co-pending application Ser. No. 11/503,810, which is incorporated herein in its entirety.

Figure 3B:
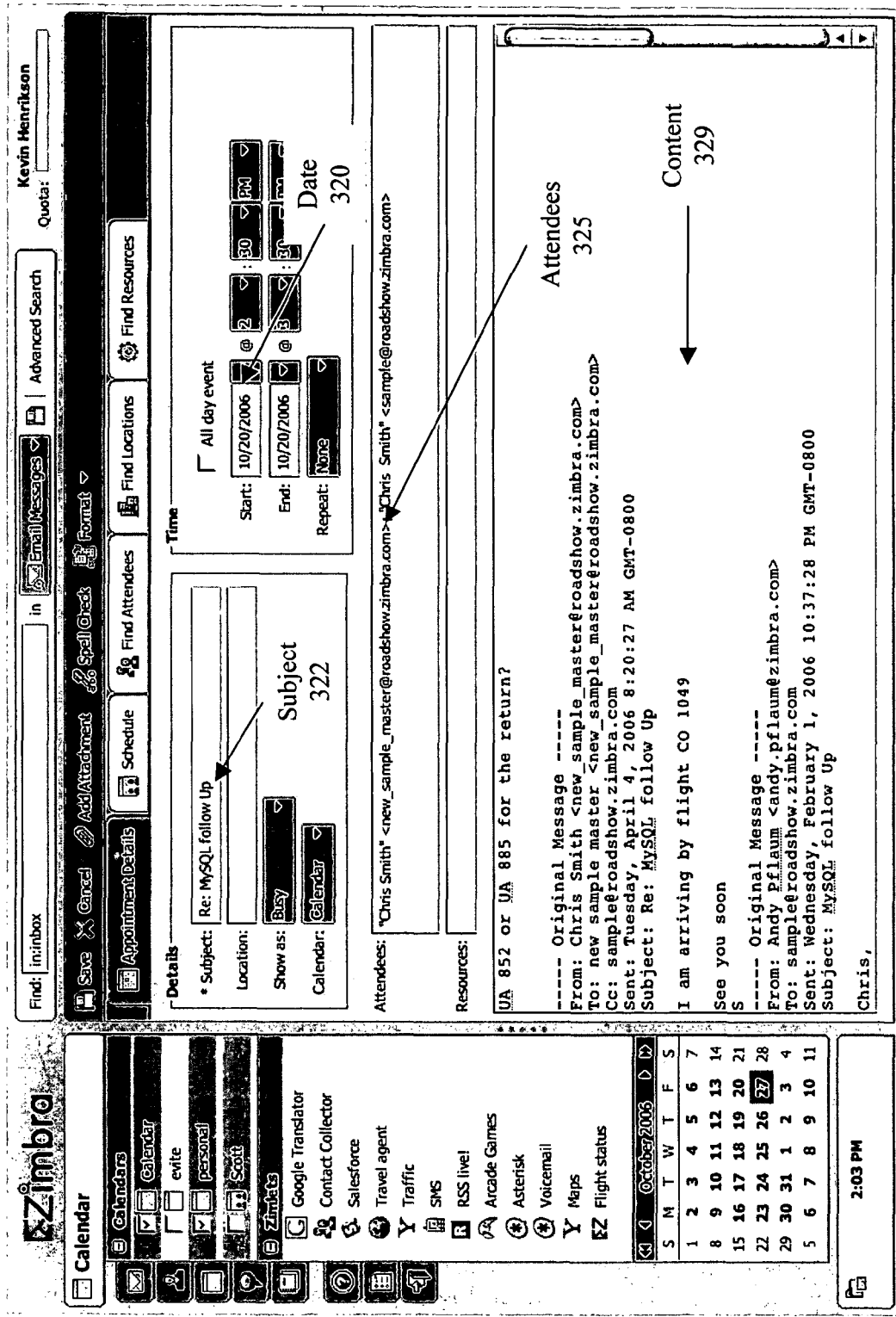
FIG. 3B is a screen shot which shows a meeting proposal created in accordance with an embodiment of the present invention.

In one embodiment, such a dragging of an email to the mini-calendar display 110 results in a meeting proposal and/or invitation being created. Such a meeting proposal can be seen in FIG. 3B. As can be seen from FIG. 3B, the date for the proposed meeting 320 is automatically populated with the date to which the email is dragged. The subject 312 of the email automatically populates the subject 322 of the meeting. The invitees/attendees 325 for the meeting are automatically populated with the people in the "To" field and the "cc" field of the email. In one embodiment, the people in the "To" field automatically populate the "Required" attendees for the meeting, while the people in the "cc" field automatically populate the "Optional" attendees for the meeting. In one embodiment, the content of the dragged email automatically populates the content 329 of the meeting invitation, thereby providing the invites with some context for the meeting invitation. The user thus needs to make only some modifications as needed (e.g., entering the appropriate time for the meeting), and then quickly send out the meeting invitation. This significantly increases the efficiency and ease of use of the collaboration suite application.

While some conventional collaboration suite applications allow dragging an email onto a calendar tab, and open up a meeting scheduling box, several of the features described above are not present in these conventional collaboration suite applications. For instance, in some of these existing collaboration suite applications, the meeting proposal comes up with only the current date, and the fields of attendees, subject etc. remain unpopulated. Thus there is no true interaction between the various elements of the collaboration suite application.

Date Content Objects in Mailbox Items

In accordance with an embodiment of the present invention, dates, days of the week, or references to specific days can be recognized by the system. For example, a reference to "tomorrow" in an email message is recognized as the day after the date the email was sent.

In one embodiment, such recognition of dates is implementing by treating such dates (or references to specific days, etc.) as content objects. A content object is content that would otherwise have been static within a mailbox item, which is allowed to become a "live" object, and to be associated with trigger events, and actions, including sending the object to a separate information system and taking some action upon information corresponding to the object within the separate information system. Co-pending application Ser. No. 11/503, 810 describes content objects in greater detail. This application is incorporated by reference herein in its entirety.

In one embodiment, date content objects are defined as any programmatically recognizable expressions that identify dates, days of the week, and so on. In one embodiment, date content objects can be regular expressions. A collaboration suite application in accordance with an embodiment of the invention recognizes any text in a mailbox item (e.g., an email, a contact, etc.) having such properties as a date content object. In one embodiment, when such a date content object is identified, it is associated with the appropriate day in the user's calendar.

Figure 4A:
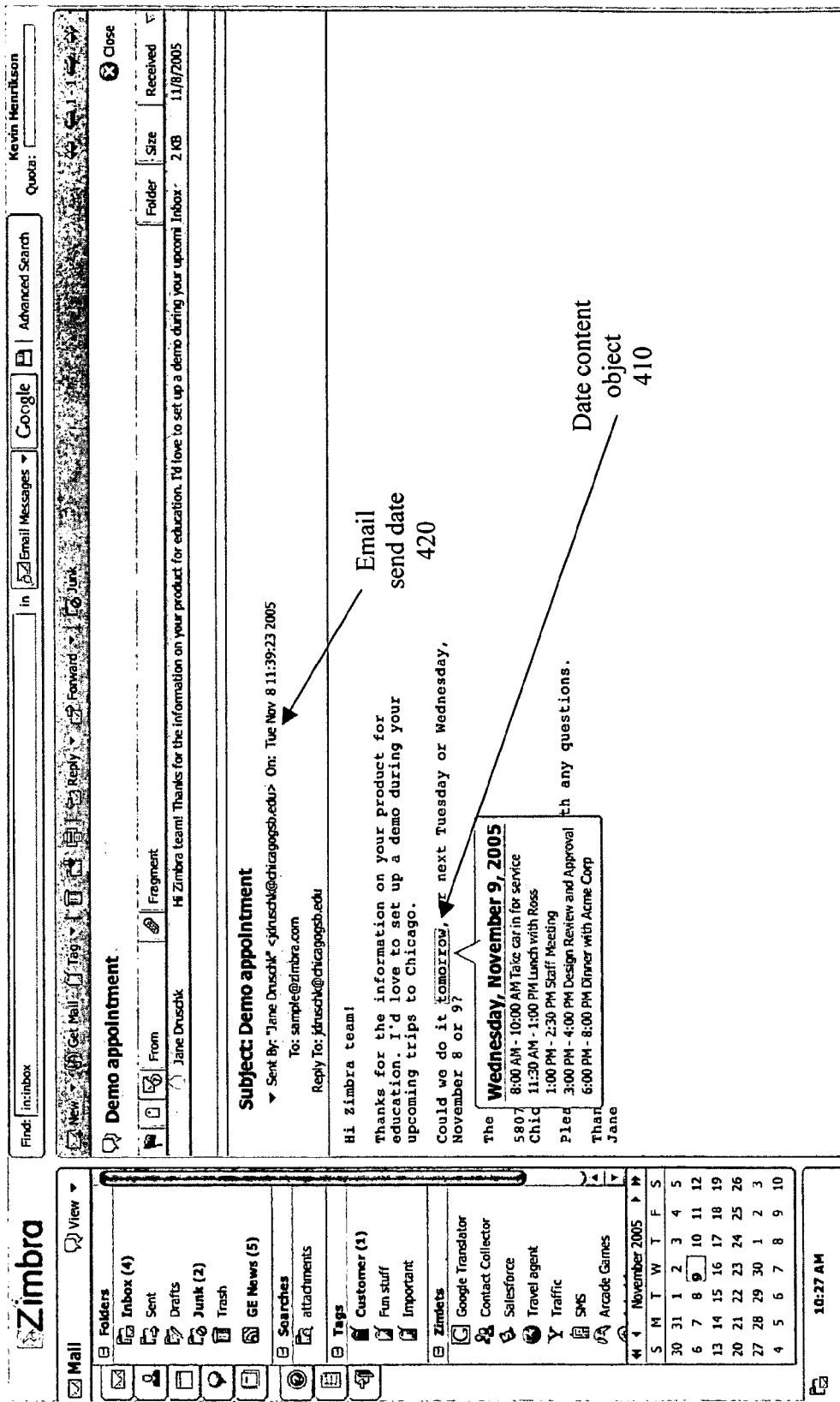
FIG. 4A is a screen shot which shows a tool tip showing the appointments on a date object recognized in an email, in accordance with an embodiment of the present invention.
Figure 4B:
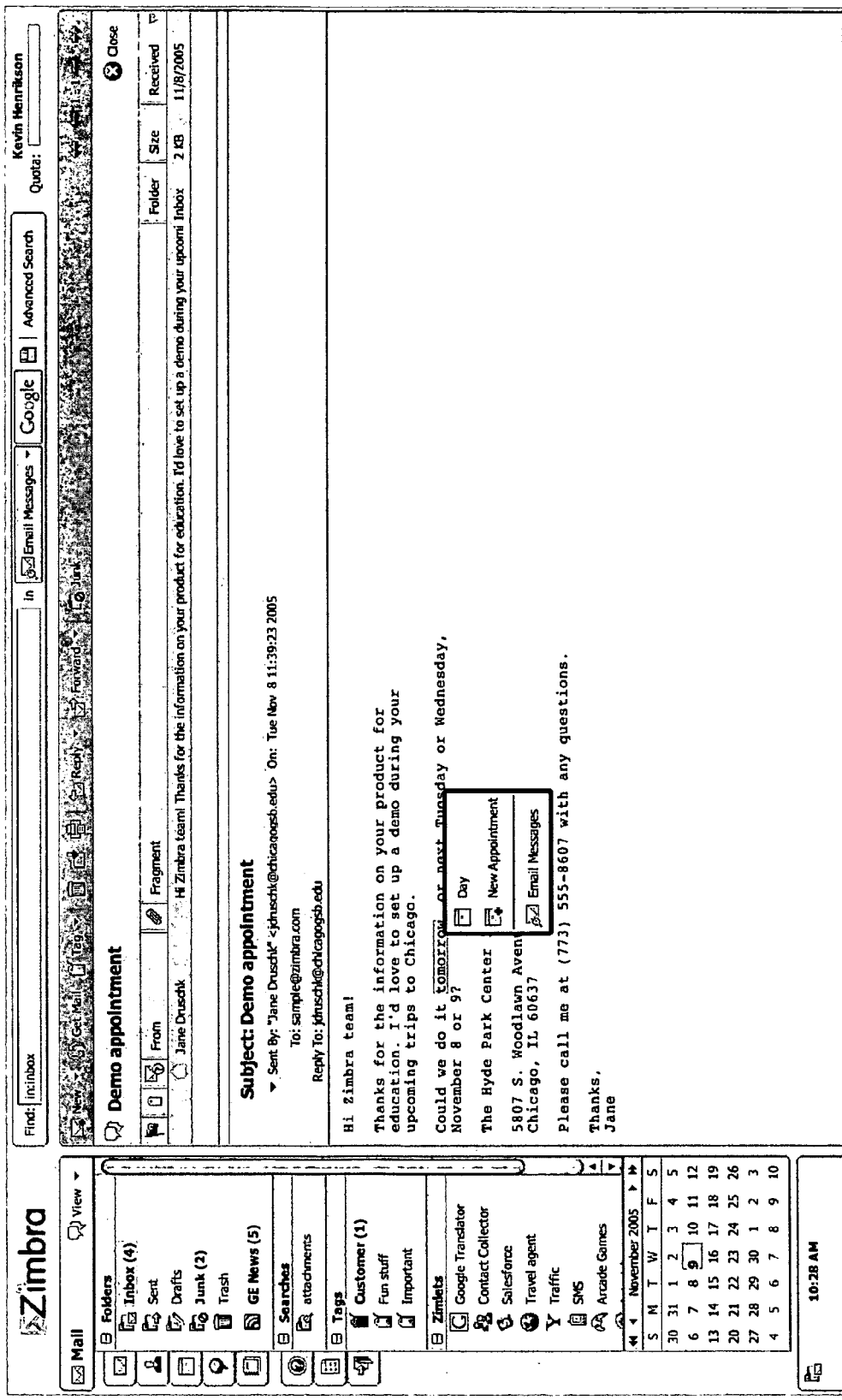
FIG. 4B is a screen shot which shows a context menu for a date object recognized in an email, in accordance with an embodiment of the present invention.

In one embodiment, when a date content object is identified, it provides the same user experience as its corresponding day in the mini-calendar display 110. For instance, if a user mouses over a date content object in an email, the appointments in the user's calendar for that day may be visible in a small tool-tip or window. This is illustrated in a screenshot in FIG. 4A. As another example, if a user right-clicks on a date content object, a context menu may appear, which may make it possible for the user to add a new appointment for that day, add a new all day appointment for that day, and/or to search emails associated with that day. This is illustrated in a screenshot in FIG. 4B. As described in above, an advantage of this is that the user can view, edit and/or add appointments to a day without opening up the calendar application in the collaboration suite application. The user can simply continue to view a mailbox item (such as an email, a contact, etc.), and seamlessly take these steps of editing, viewing and/or adding appointments to a day.

Referring again to FIG. 4A, it can be seen that "tomorrow" 410 is recognized as a date content object. This date content object is associated with a date by putting it in the context of a date associated with the mailbox item—in this case, the date 420 the email was sent. Here, the email was sent on Tuesday, Nov. 8, 2005. Thus the date content object "tomorrow" 410 is associated with the Wednesday, Nov. 9, 2005.

In one embodiment the types of date-related words and date formats that can be recognized as date content objects include, but are not limited to:

Today, tomorrow, yesterday, day after tomorrow, day before yesterday

Monday, Tuesday, Wednesday, Thursday, Friday, Saturday, Sunday (and common abbreviations for these days). Localized versions are included e.g., I18N is supported.

1 Jan 06
Jan. 1 06
Jan. 1, '06
Jan 1, 2006
January 1, 2006
1/1/06
1/1/2006
1-1-06

It is to be noted that in one embodiment the European date format (with the day first, followed by the month), as well as the American date format (with the month first, followed by the day), can be recognized. In one embodiment, the appropriate date format is identified based on the user's location. In one embodiment, the appropriate date format is identified based on the sender's location. Further, such date-related words which are identified as date content objects may be language dependent. For instance, words for different days of the week, month, and words such as today, tomorrow etc. in different languages may be recognized.

As mentioned above with reference to FIG. 4A, in one embodiment date content objects are associated with specific days, relative to a specific date in the mailbox item in which the date content object is identified.

Calendar Views/UI

In one embodiment, the calendar view/UI can be enhanced to further convenience the user.

One example of such calendar view enhancements is to depict differently on the calendar, meetings/appointments with different statuses. It is to be noted that the words "meeting" and "appointment" are used interchangeably here, and should be interpreted as appropriate based upon the context.

In most conventional calendaring applications, a meeting stays on the user's calendar when the user accepts (or tentatively accepts) the meeting (or while the user has not yet responded to the meeting), but disappears off the user's calendar view once the user rejects the meeting. In some cases, it may be beneficial for the user to be able to continue to view a rejected meeting, such as if her schedule changes and participating in the meeting becomes feasible, and/or she later simply changes her mind, and decides to accept the meeting.

Figure 5A:
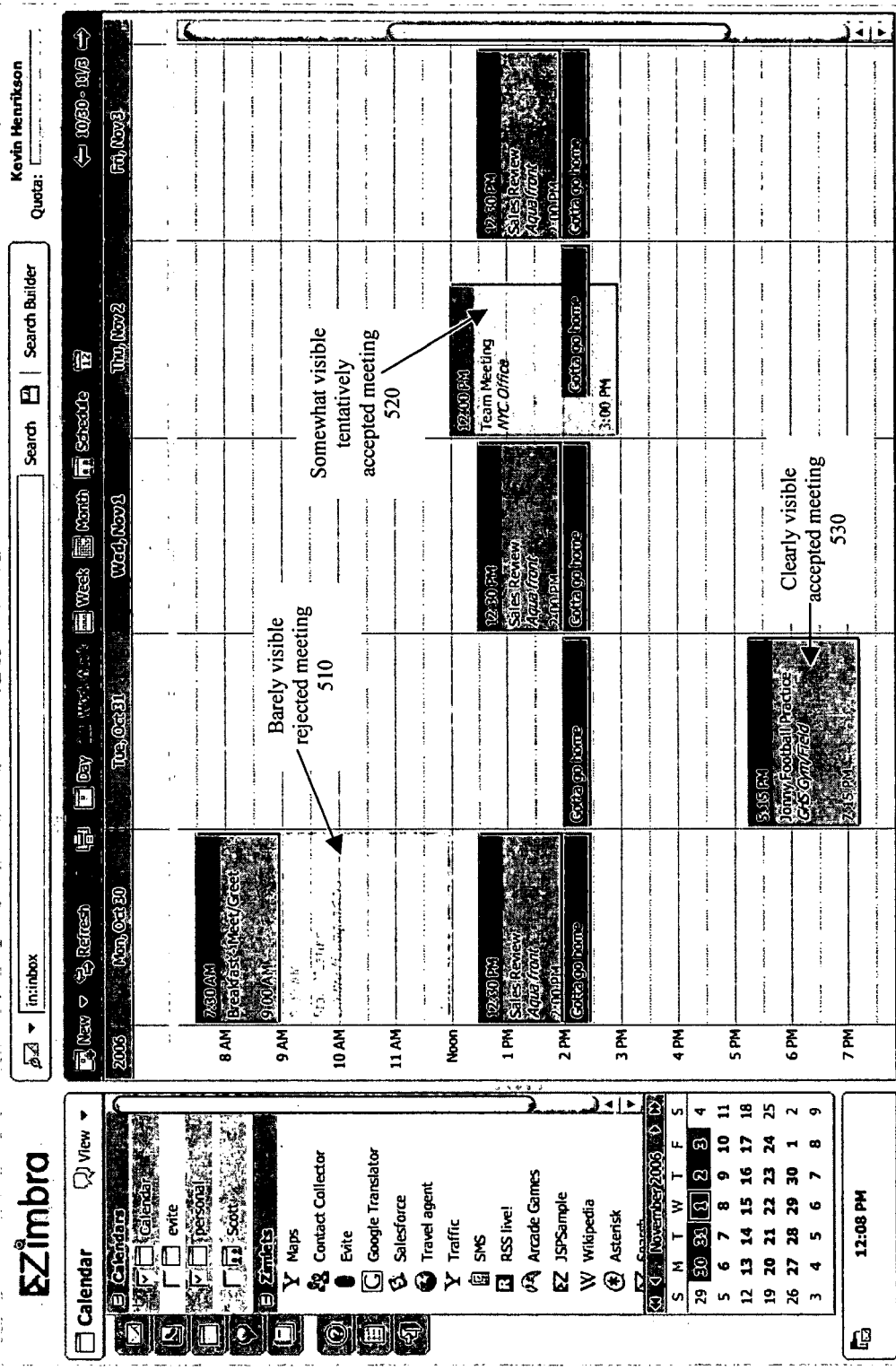
FIG. 5A is a screen shot which shows the different appearance of rejected, tentatively accepted, and accepted meetings, in accordance with an embodiment of the present invention.

In one embodiment, meetings rejected by the user appear different from meetings that are accepted by the user. In one embodiment, meetings that are tentatively accepted by the user appear still different. In other words, the appearance of the calendar entry is different based on the status of the entry. For instance, accepted, tentatively accepted, and rejected meetings may each have different opacities. As one example, tentatively accepted meetings appear slightly translucent, while rejected meetings appear very translucent. In such an embodiment, the rejected meetings are somewhat transparent/barely visible. This can be seen in FIG. 5A, where rejected meeting entries 510 are depicted very translucently and are barely visible, tentatively accepted meeting entries 520 are depicted somewhat translucently, and accepted meeting entries 530 are depicted in an opaque manner. In another embodiment, the appearance of the calendar entries can be in gray scale, but meetings with different statuses are depicted in differing shades of gray. Yet another example of the appearance of the entries in a calendar being dependent on their status is that different colors and/or color saturations may be used. For instance, new appointments (which have not yet been responded to) can appear in very saturated (vivid) colors, whereas once they have been accepted, they are depicted in a less saturated shade.

Figure 5B:
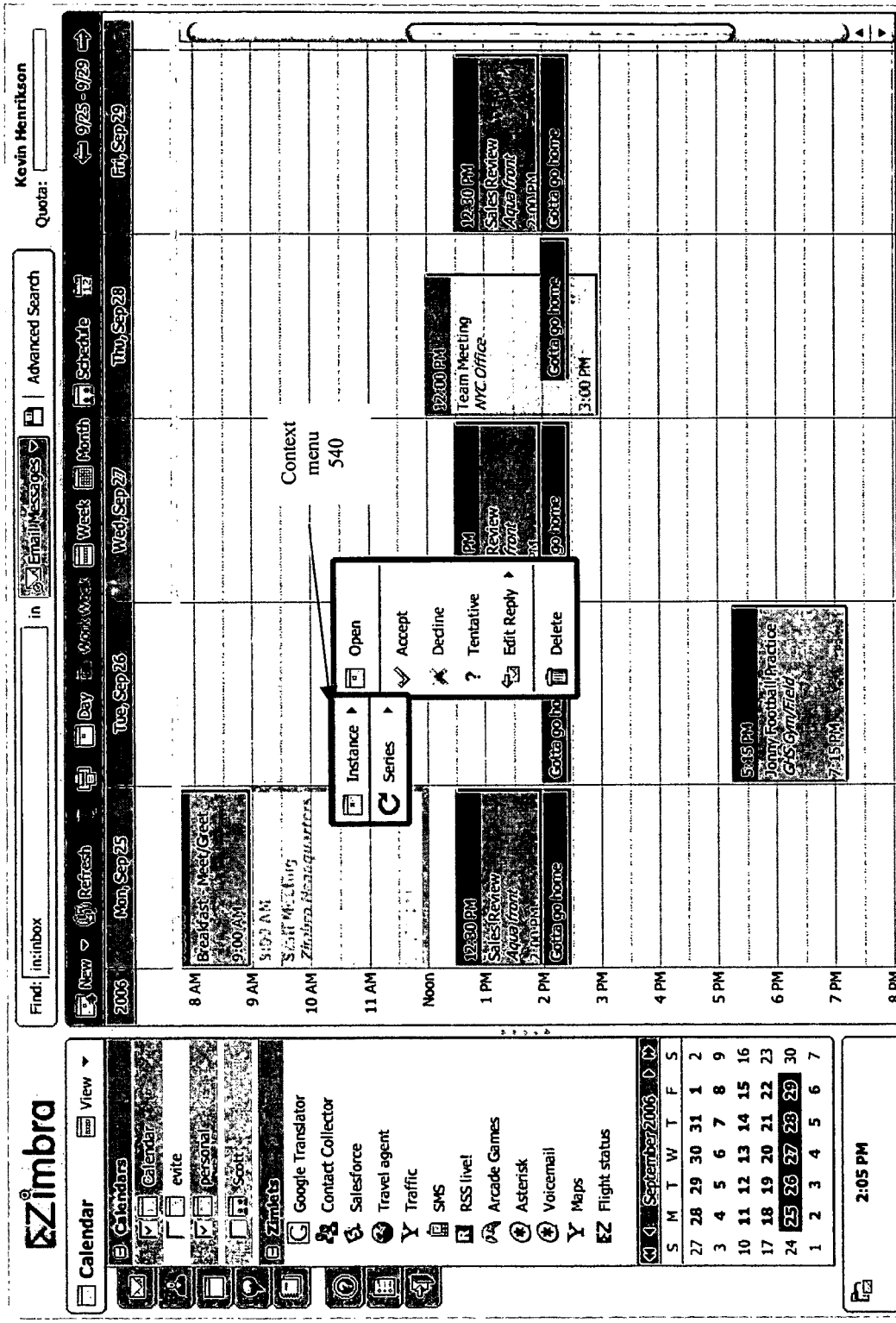
FIG. 5B is a screen shot which shows a context menu for a rejected meeting, in accordance with an embodiment of the present invention.

In one embodiment, interacting with the entry corresponding to a meeting can allow the user to perform certain actions. In one embodiment, right clicking on a rejected meeting results in a context menu 540, which can be seen in FIG. 5B. In one embodiment, such a context menu allows the user to change his response to the meeting. If the user were to accept such a previously rejected meeting, the appearance of the meeting entry changes to match the appearance of other meeting entries having the new status (e.g., accepted status).

Figure 6:
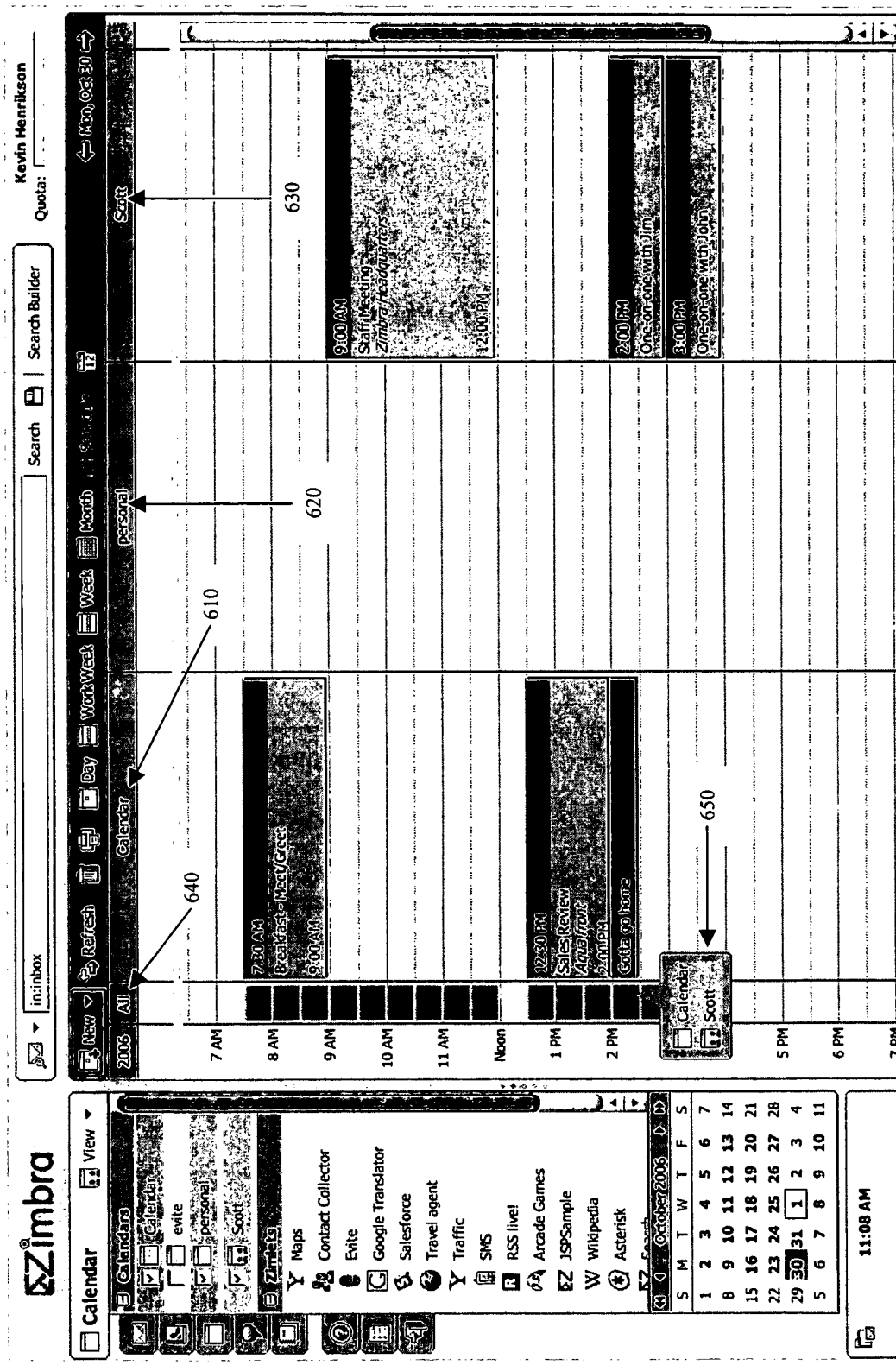
FIG. 6 is a screen shot which shows simultaneous viewing of multiple calendars, in accordance with an embodiment of the present invention.

Another aspect of the enhanced UI for the calendaring application is related to simultaneously viewing multiple calendars. FIG. 6 is a screen shot of an embodiment of the present invention, where three calendars are viewed side by side.

It can be seen from FIG. 6 that three calendars are visible—the user's calendar entitled "Calendar" 610, the user's personal calendar entitled "personal" 620, and Scott's calendar entitled "Scott" 630. Each of these calendars is displayed in a column. In the embodiment shown, each calendar has its entries shown in a different color.

In addition, it can be seen that another column entitled "All" 640 is present in the screen shot. In one embodiment, this column 640 provides collective information regarding the various calendars presented in the view. In one embodiment, the column 640 provides a visual indication of the collective availability of the calendars visible in the view. The column 640 can be referred to as a calendar thermometer, and is comprised in one embodiment of individual bars/sections corresponding to different time slots in the calendar. In one embodiment, the appearance of each bar indicates the cumulative availability in that time period based on the calendars 610, 620 and 630 visible in the calendar view.

In FIG. 6, the vertical column 650 indicates the availability of the adjacent three calendars 610, 620 and 630 by 30 minute time periods. When all three calendars 610, 620, and 630 have no entries in a particular 30 minute time slot (e.g., from 7:00-7:30 am), the bar in column 640 corresponding to that time slot has a certain appearance (e.g., is very light in color). If a particular time slot is occupied or busy (has scheduled appointments) in each of the three calendars 610, 620 and 630, then the bar in column 640 corresponding to that time slot has a different appearance (e.g., very dark color). In one embodiment, the more calendars that are occupied for a particular time slot, the darker the bar in the calendar thermometer for that time slot. The more calendars are available for a particular timer period, the lighter the bar in the calendar thermometer corresponding to that time slot. For instance, when only one calendar is occupied (e.g., from 10:30-11:00 am), the corresponding bar in the calendar thermometer is a little darker. When two calendars are occupied (e.g., 2:00-2:30 pm), the corresponding bar in the calendar thermometer is darker still.

It is to be noted that the calendar thermometer 640 and its different bars (as well as the rest of the calendar view) can be in different colors, or in grayscale, and so on. In one embodiment, a red-to-pink-to-white color range is implemented, with the collectively busiest time slots in the calendar thermometer being shown in red, while collectively most available time slots in the calendar being shown in white.

In one embodiment, the user can interact with the different bars in the calendar thermometer 640. For instance, hovering over a particular bar in the calendar thermometer 640 can result in a tool-tip/window 650 appearing, with the names of the busy calendars during that time slot. This facilitates a user's quickly identifying the calendars that are busy during the particular time slot.

Calendar Sharing

In one embodiment, a user interface is provided that enables a collaboration suite application user to easily and seamlessly share calendars (a user can have more than one calendar) with someone else. In one embodiment, the other user also uses the same collaboration suite application. In another embodiment, the other user uses a different collaboration suite application.

The user sharing the calendar is referred to as the sharer or grantor, while the recipient of the request is referred to as the sharee or grantee. An example of a situation where calendar sharing may be desirable is where the boss is the sharer, and the secretary is the sharee.

Figure 7A:
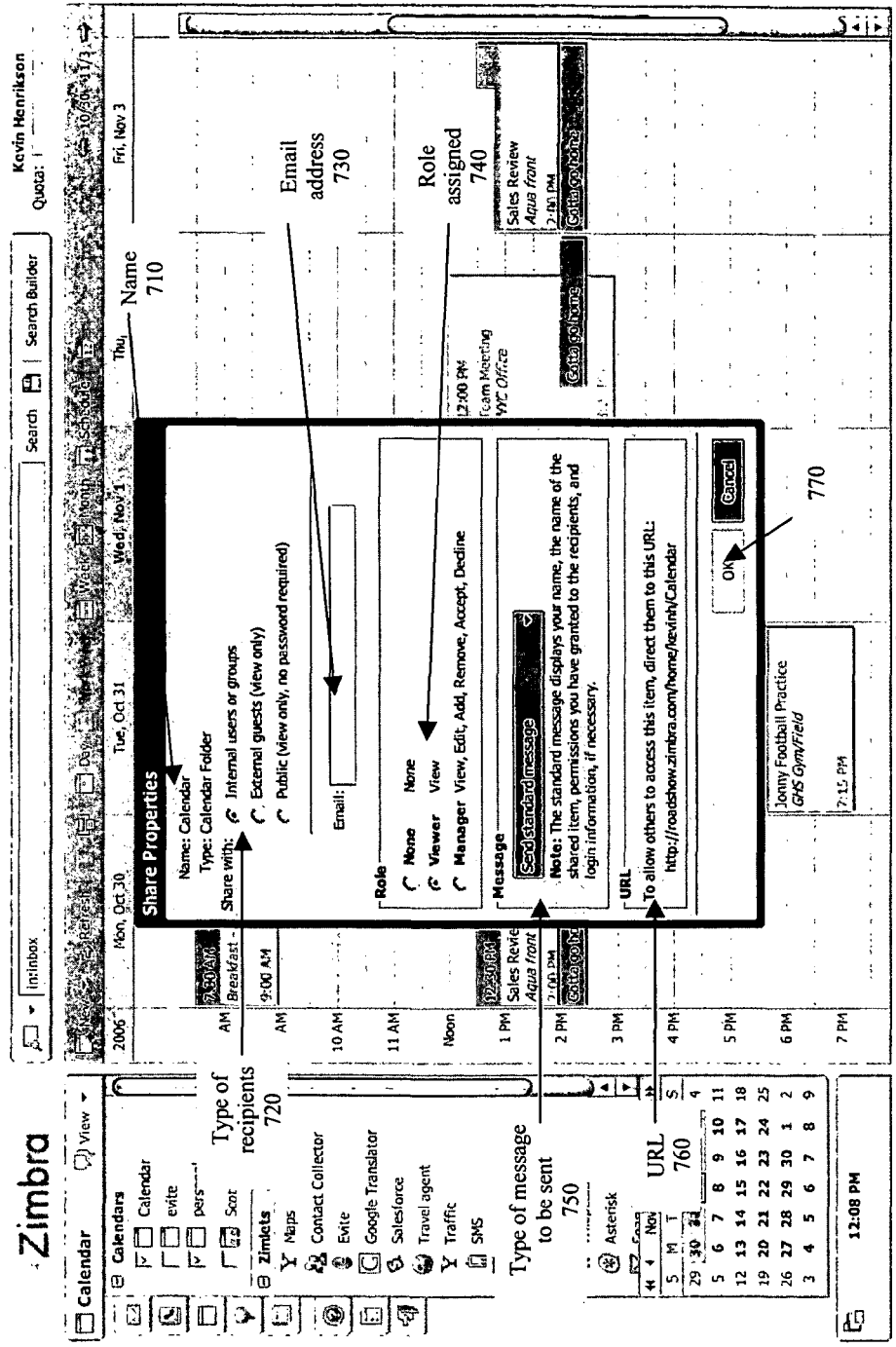
FIG. 7A is a screen shot which shows a creation of a share request, in accordance with an embodiment of the present invention.

In one embodiment, the sharer initiates the share request in the UI of the calendaring application of the collaboration suite application. FIG. 7A is a screenshot of a dialog box for a share request that provides a sharer with various options regarding how/with whom to share his calendar. When a user enters this share window (e.g., by selecting share calendar from a menu) from a particular calendar, the name 710 of the calendar is automatically populated in the share window. In the embodiment shown, each calendar is treated as a folder. The sharer can then select the type of user that he wants to share his calendar with. In the embodiment shown, this selection can occur via radio buttons 720, and the sharer can select between the types of recipients of the share request, such as internal users or groups, external guests (view only), or the public (view only, no password required). The sharer can enter the email address 730 of the recipient(s) of the share request.

In one embodiment, the sharer can also specify a particular role 740 for the recipient (e.g., viewer, manager). This role determines the privileges that the recipient has for the shared calendar (e.g., only view it, or manage it by viewing, editing, adding, removing, accepting, and/or declining meetings). The possible roles may be dependent on the type of recipient 720 selected.

Further, the sharer can specify what type of message 750 to send to the recipient of the share request. For instance, selecting "Send standard message" sends an email to the recipient with the name of sharer, the name of the shared item (e.g., the calendar to be shared), permissions granted to the recipient, and login permissions, if needed. Examples of other types of messages 750 the sharer can send include adding a note to a standard message, and composing the email in a new window. In one embodiment, the sharer can also choose not to send mail about the share.

Moreover, in one embodiment, the user is informed of the Uniform Resource Locator (url) 760 at which his shared calendar will be available. So if the user later wanted to share the same calendar with someone else, he could simply send them the url (and login information if needed). In one embodiment, if the calendar is being shared publicly, then no password is needed to access the calendar.

In one embodiment, when the user clicks "ok" 770, in one embodiment, an Access Control Entry (ACE) is modified to grant specific privileges (e.g., viewing, writing, editing) to the sharee. In one embodiment, an email message is sent to the sharee, informing the sharee of the share request. In one embodiment, the email message is in HTML format.

In one embodiment, the recipient can respond to the share request (e.g., accept or reject the offer to share) in the email itself. In one embodiment, when a user elects to share his calendar with another user, the recipient of the share request receives an email message that includes a dialog box in which the recipient can accept, decline, and configure the view of the shared calendar. This enables a recipient of a share request to seamlessly and easily respond to the request.

When a sharee within the collaboration suite system accepts the share request, in one embodiment a mount point is created in the sharee's mailbox. In general, a mount point is a term used to describe where the computer puts the files in a file system. In one embodiment, the mount point is a pointer to the calendar folder being shared by the sharer. In one embodiment, the way in which the sharee can access the shared calendar folder is similar to filesystem mounting. The shared calendar folder is the filesystem "device" (e.g./dev/sda1), and the pseudo-folder in sharee's mailbox is the mount point. In one embodiment, if the sharer and sharee have mailboxes on different mail servers, the system will proxy requests between the mail servers appropriately. In one embodiment, such mounted calendars appear in sharee's calendar UI, in the calendar list with individual checkboxes. The sharee can select individual checkboxes to determine which calendars' appointments should be visible.

If the sharee is granted permission to write/edit the shared calendar, then the sharee will be able to not only view the shared calendar, but will also be able to create new appointments/meetings, respond to meeting request, change previous responses to meeting requests, and so on. In one embodiment, the sharee can masquerade as the sharer. That is, the actions of the sharee appear in the collaboration suite as though the sharer had taken those actions. (e.g., actions by a sharee secretary appearing as actions taken by the sharer boss). In another embodiment, it can be apparent that the action is taken by the sharee. (e.g., actions by a sharee secretary appearing as actions taken "on behalf of" the sharer boss). In one embodiment, such clarity on who (the sharer or the sharee) is taking the actions can be implemented by setting From/Sender email headers and equivalent iCalendar (a standard for calendar data exchange) fields to indicate that the entry (e.g., meeting) is owned by the sharer, but the action is being taken by the sharee on his behalf. In another embodiment, how the entries appear is specific to each entry. Such a choice may be made by the sharee for each entry. In another embodiment, how the entries appear (e.g., by sharer, or on behalf of sharer, as determined by the sharer for each entry etc.) is determined by the sharer of the calendar.

Another consideration is related to processing responses to a meeting request. Say a sharee (a secretary) is setting up a meeting for the sharer (the boss). In one embodiment, responses to this meeting request (e.g., replies from the invitees of the meeting) go directly to the sharer's mailbox. This has the advantage of giving the sharer better visibility into who will be able to attend the meeting etc. In another embodiment, the responses to such a meeting request from the sharee, will go to the sharee's mailbox. This has the advantage of the sharer's mailbox not being cluttered, and his not having to deal with the various responses. For example, a boss can leave the set up of a meeting entirely to his secretary, without having to deal with each response as it comes in, and so on. In one such embodiment, a way for the sharer to determine who is attending and who is not is implemented (e.g., by including a "tracking" tab), so as to still provide the sharer with some visibility and control. It is to be noted that the embodiments of the present invention work even when the sharer's and sharee's mailboxes are on different mailbox servers.

Figure 7B:
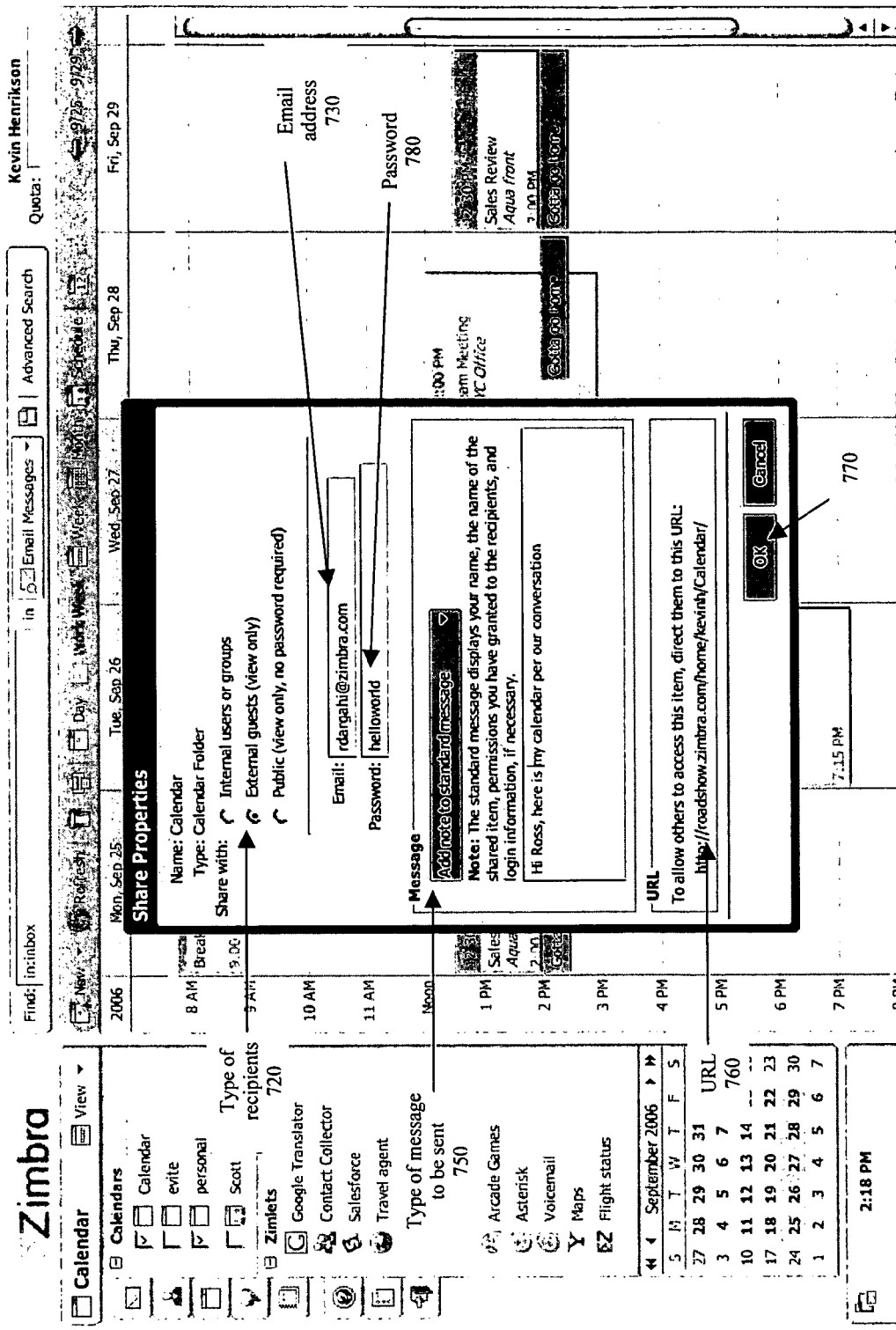
FIG. 7B is a screen shot which shows a creation of a share request, in accordance with another embodiment of the present invention.

In one embodiment, the sharing of a calendar can occur via a URL. A URL can be sent (e.g., in an email) to a sharee as a link to the sharer's calendar. In accordance with one embodiment of the present invention, in order to create a share request, the sharer selects the calendar folder, selects share, then select viewer option. The share is protected by the username (in one embodiment, the username is, by default, the email address of the sharer) and password. The password is sent in with the share invitation. If a public share is desired, this is the same as above, but there is no password to protect the share. In such a situation, anyone can point the browser to the share URL and download the calendar data. This can be seen in FIG. 7B. In FIG. 7B, the user has chosen an external type of recipient 720. In this embodiment, only the role of viewer is allowed for external recipients. Thus no role 740 is explicitly assigned here. In this screen shot, a password 780 is provided for the share. It can be seen that the type of message 750 being sent here is a standard message with a note.

Figure 8:
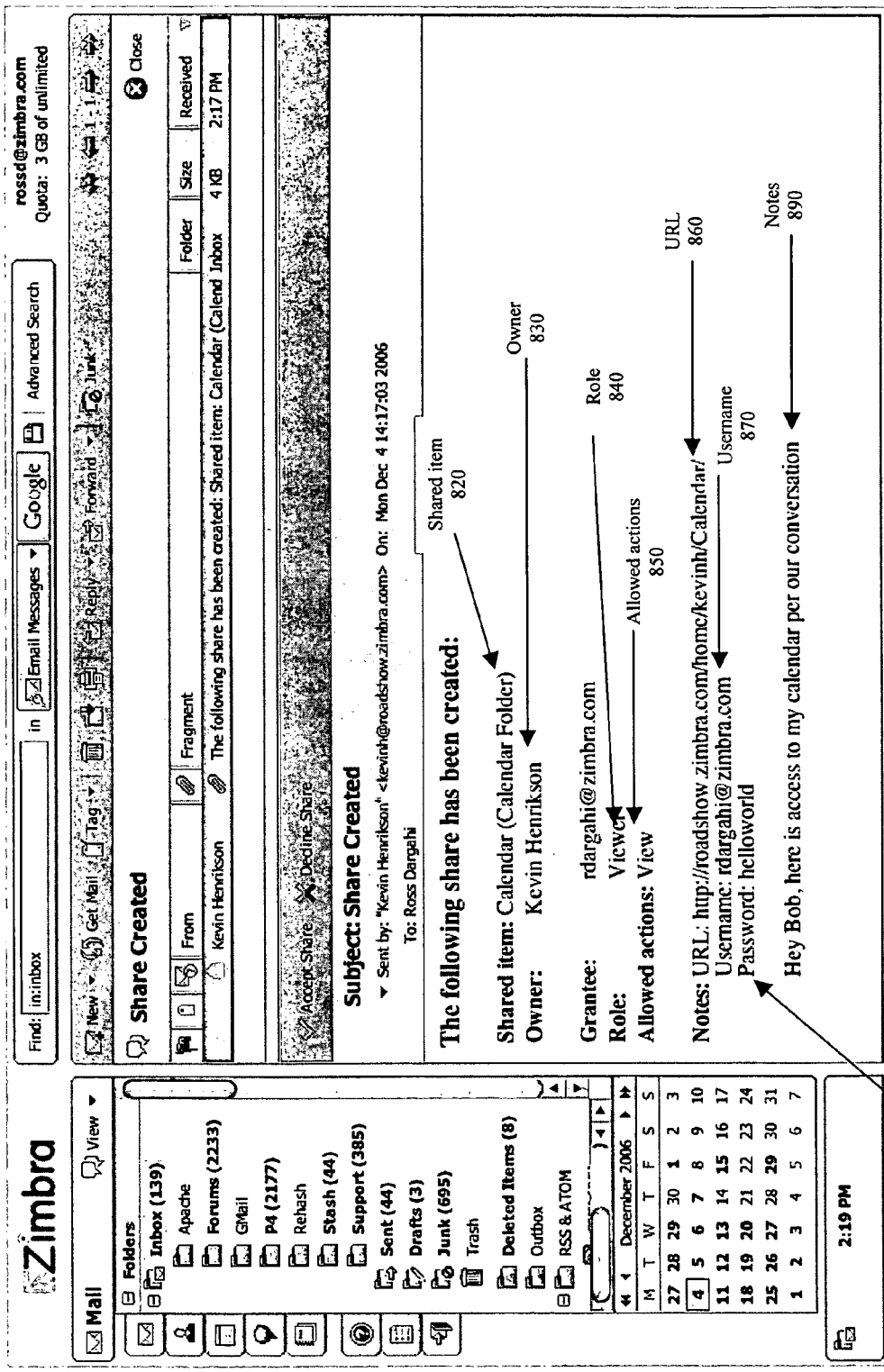
FIG. 8 is a screen shot which shows an email received by the recipient of the share request, in accordance with an embodiment of the present invention.

FIG. 8 is a screen shot which illustrates what the sharee sees when the sharer sends him the share request, in accordance with one embodiment of the present invention. As can be seen in FIG. 8, the sharee receives an email with the subject "Share Requested" 810. The shared item 820, the owner of the shared item 830, the role assigned to the sharee 840, and the actions allowed 850 are all in the email received. In addition, the URL of the shared calendar 860, and the username 870 and the password 880 required to access the calendar are also included in the email. Further, any notes 890 written by the sharer are also included.

Figure 9A:
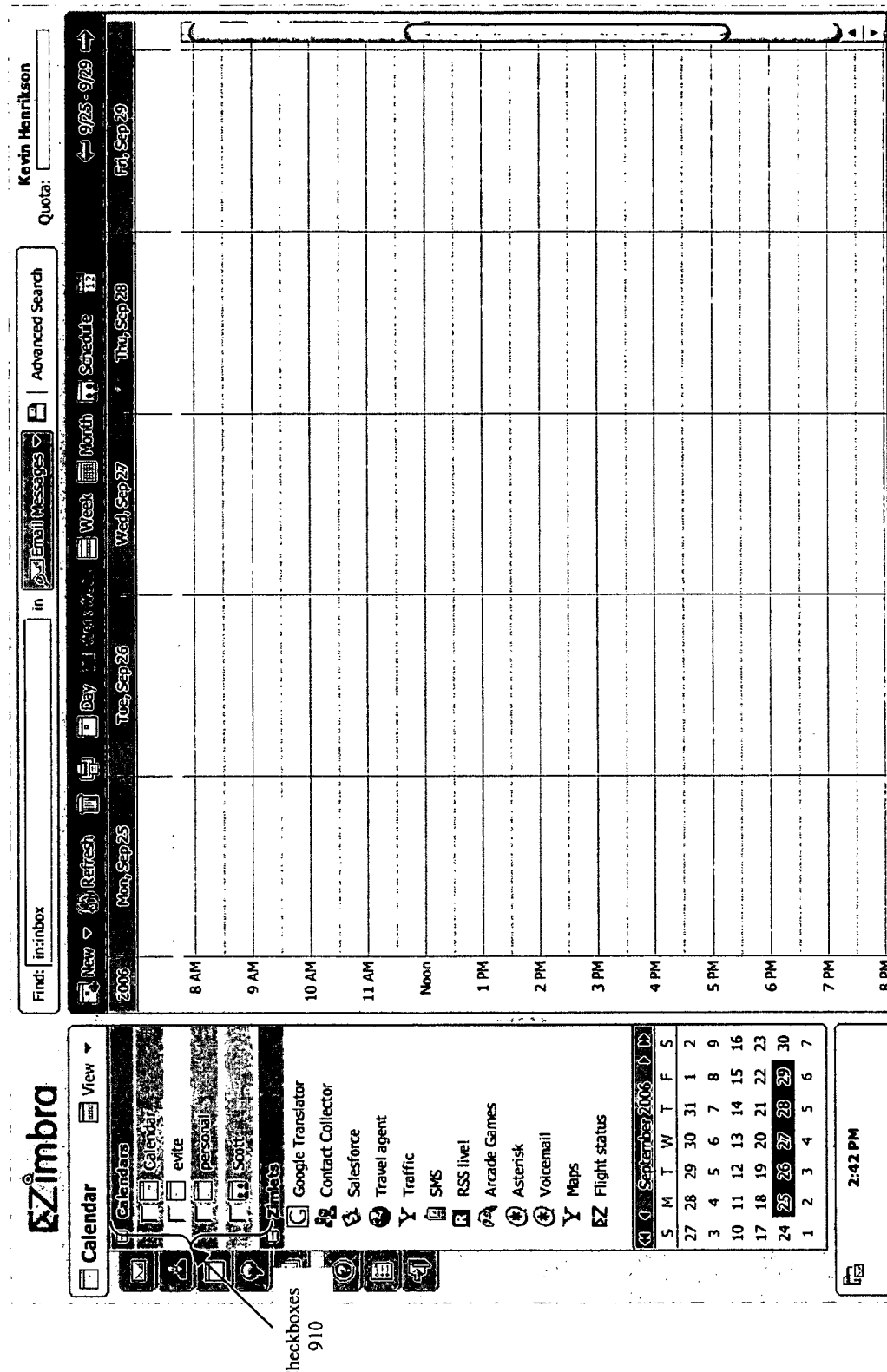
FIG. 9A is a screen shot which shows a calendar list with no calendars selected, in accordance with an embodiment of the present invention.
Figure 9B:
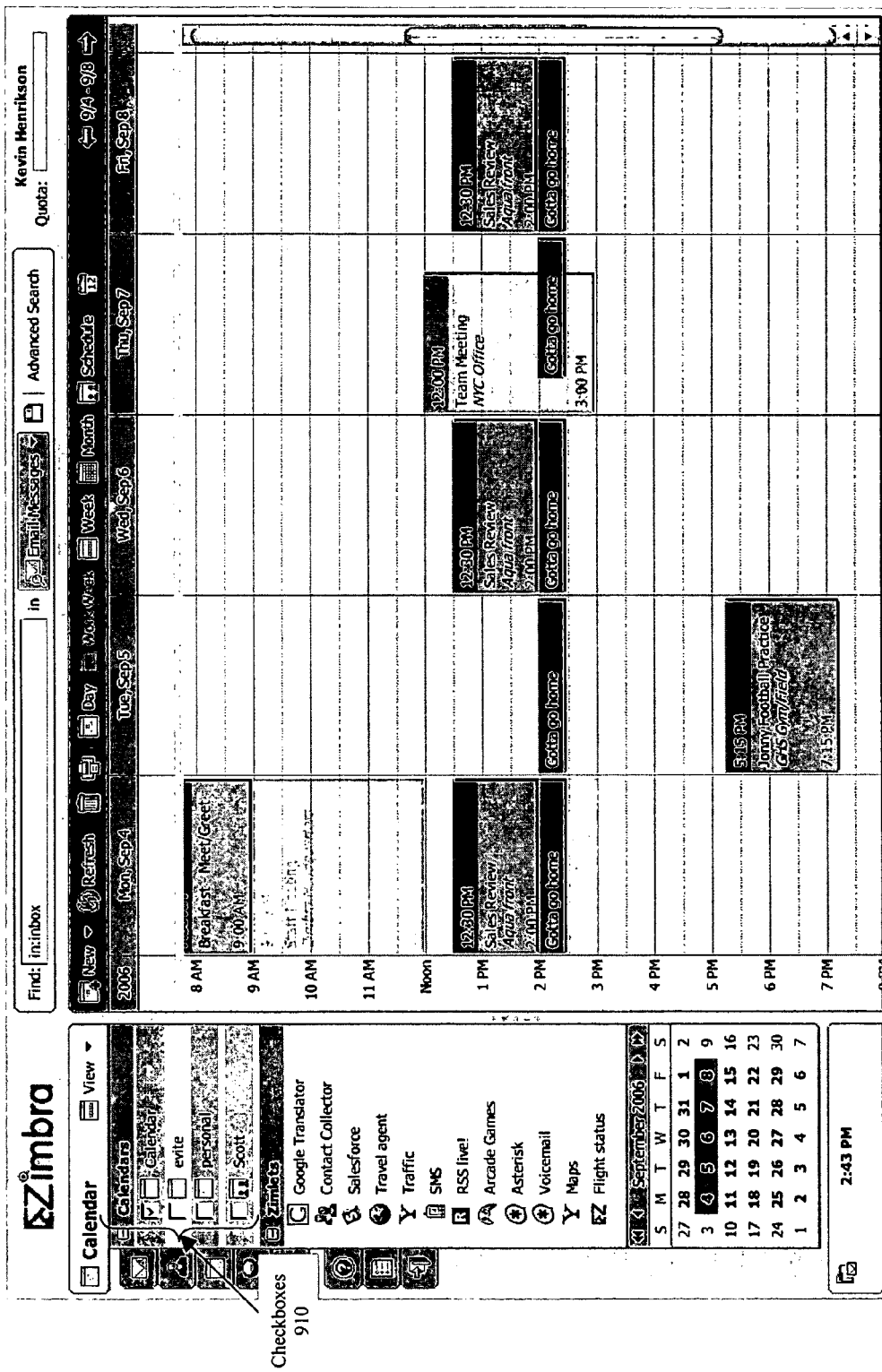
FIG. 9B is a screen shot which shows a calendar list with one calendars selected, in accordance with an embodiment of the present invention.
Figure 9C:
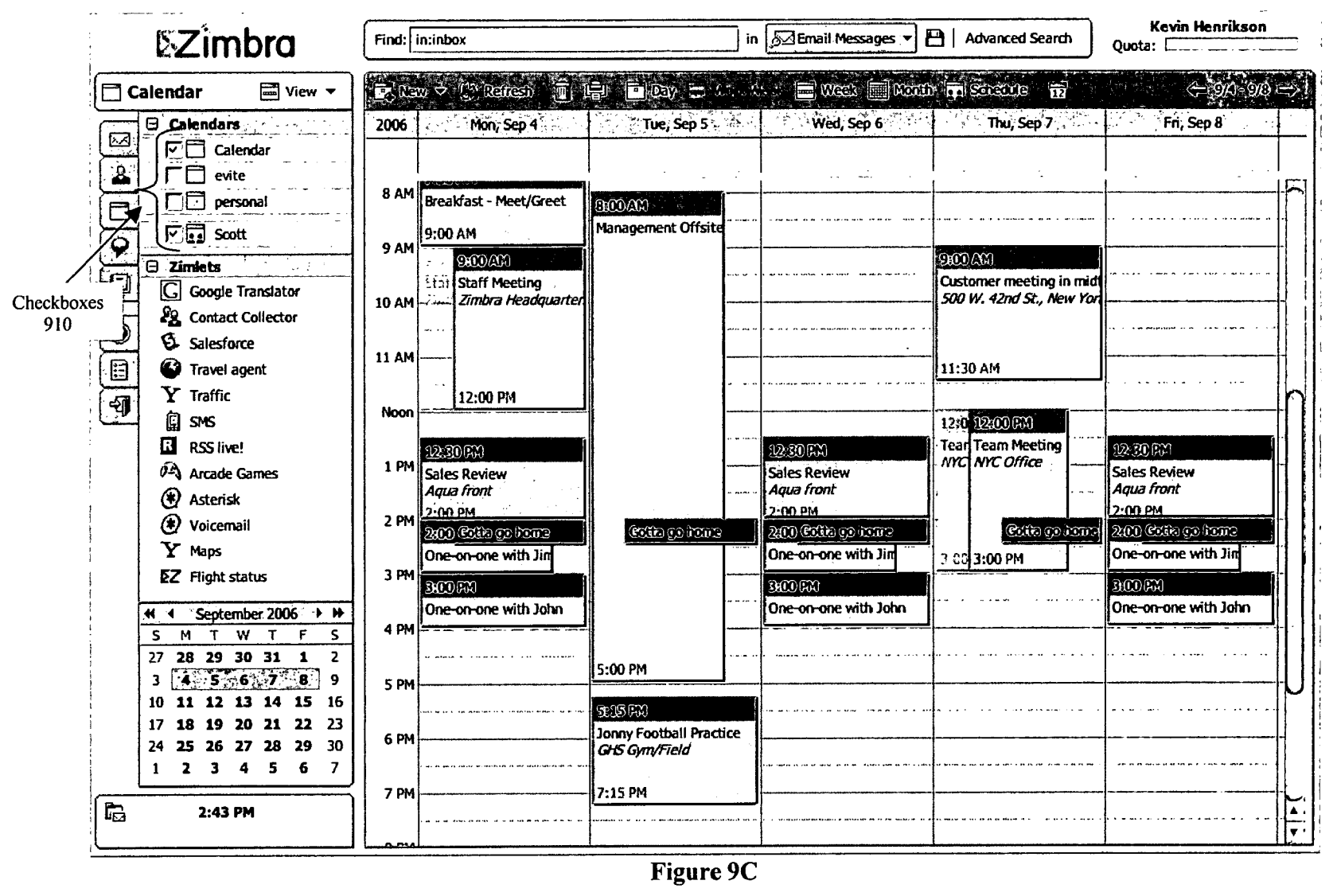

It can be seen in FIG. 9 that the sharee can determine, from a list of checkboxes 910, which calendars' appointments to view. For each calendar checked in the calendar list, a separate GetApptSummaries request is made to retrieve meetings for each calendar. In FIG. 9A, no checkboxes 910 are checked, and so no appointments are shown in the calendar displayed. In FIG. 9B, the "Calendar" checkbox 910 is checked, so the appointments for the folder entitled "Calendar" are displayed. In FIG. 9C, the "Calendar" checkbox and the "Scott" checkbox 910 are checked. Thus the appointments for these two calendars are displayed together on the calendar. In one embodiment, appointments from different calendars can be displayed in different colors.

It is to be noted that the calendar can be shared in a different way from that described above, which is simply an embodiment of the present invention.

Figure 10:
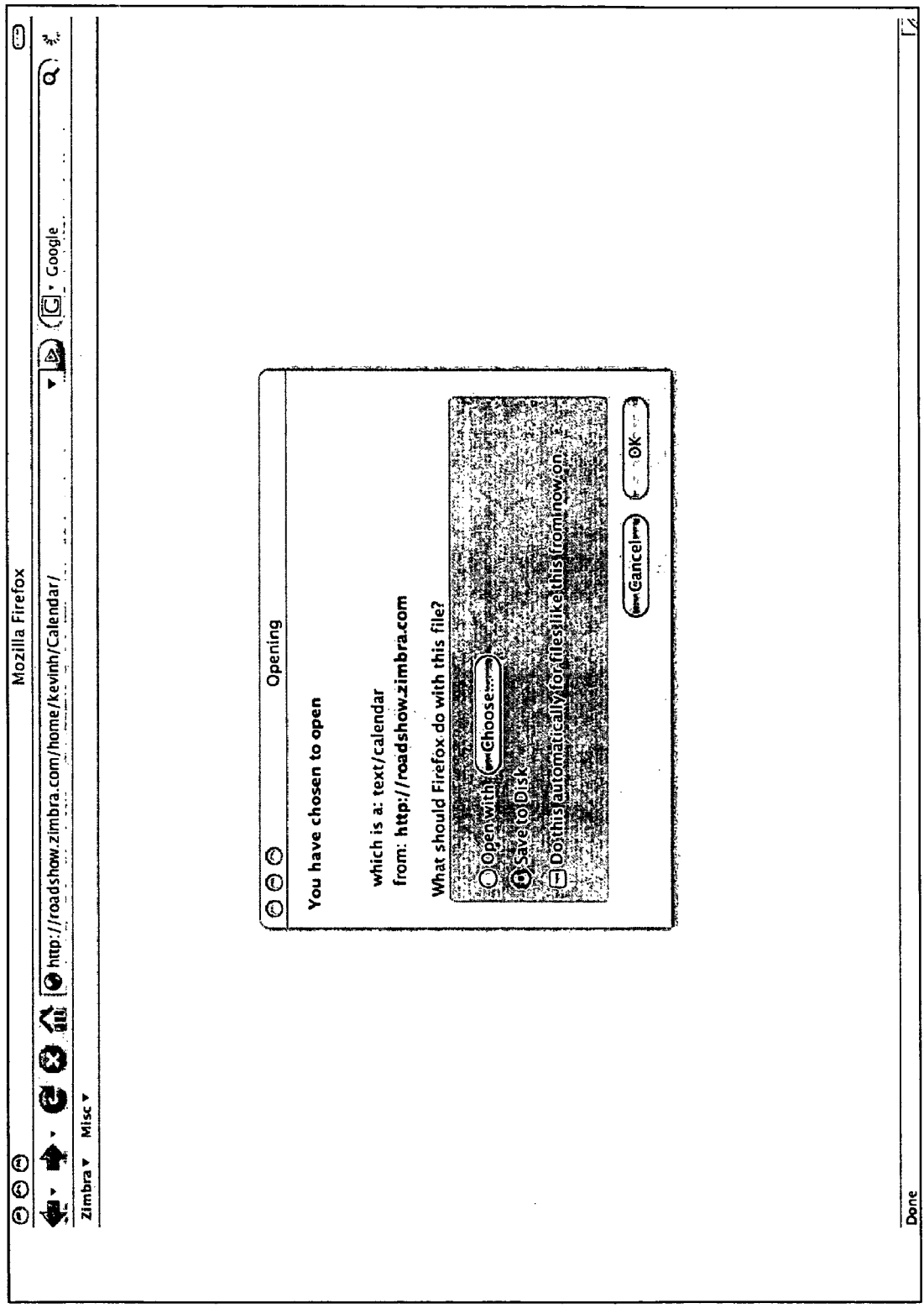
FIG. 10 is a screen shot which shows that a recipient of a share request has to open or download a file to view a calendar in accordance with an embodiment of the present invention.

As mentioned above, the sharee receives the share email with the URL, username, and password to access the share. In one embodiment, the URL sent is based upon the Representational State Transfer (REST) interface. The REST interface returns .ics iCalendar files, which needs to be downloaded and manually imported to the calendar application. This can be seen in FIG. 10. This is time consuming and inconvenient for the sharee. Also, this requires that the sharee needs an application (e.g., Apple iCal) that will allow the .ics file to be viewed. In another embodiment, instead of .ics, html is used to render the calendar directly in the browser. In another embodiment, instead of .ics, rss/atom is use to deliver calendar content.

If the sharee is granted access to not only view, but to also edit/manage the sharer's calendar, then in the embodiment based on REST described above, the sharee may also upload .ics iCalendar files to the Zimbra Server to make changes to the sharer's calendar via REST interface.

In one embodiment, the calDAV protocol is used. In such an embodiment, the calDAV enabled calendar application is synchronized directly with the server hosting the calendaring application, and the calendar data can be accessed/edited as though the sharee were using the calendar application.

Example of a System Implementing Embodiments of the Present Invention

Figure 11:
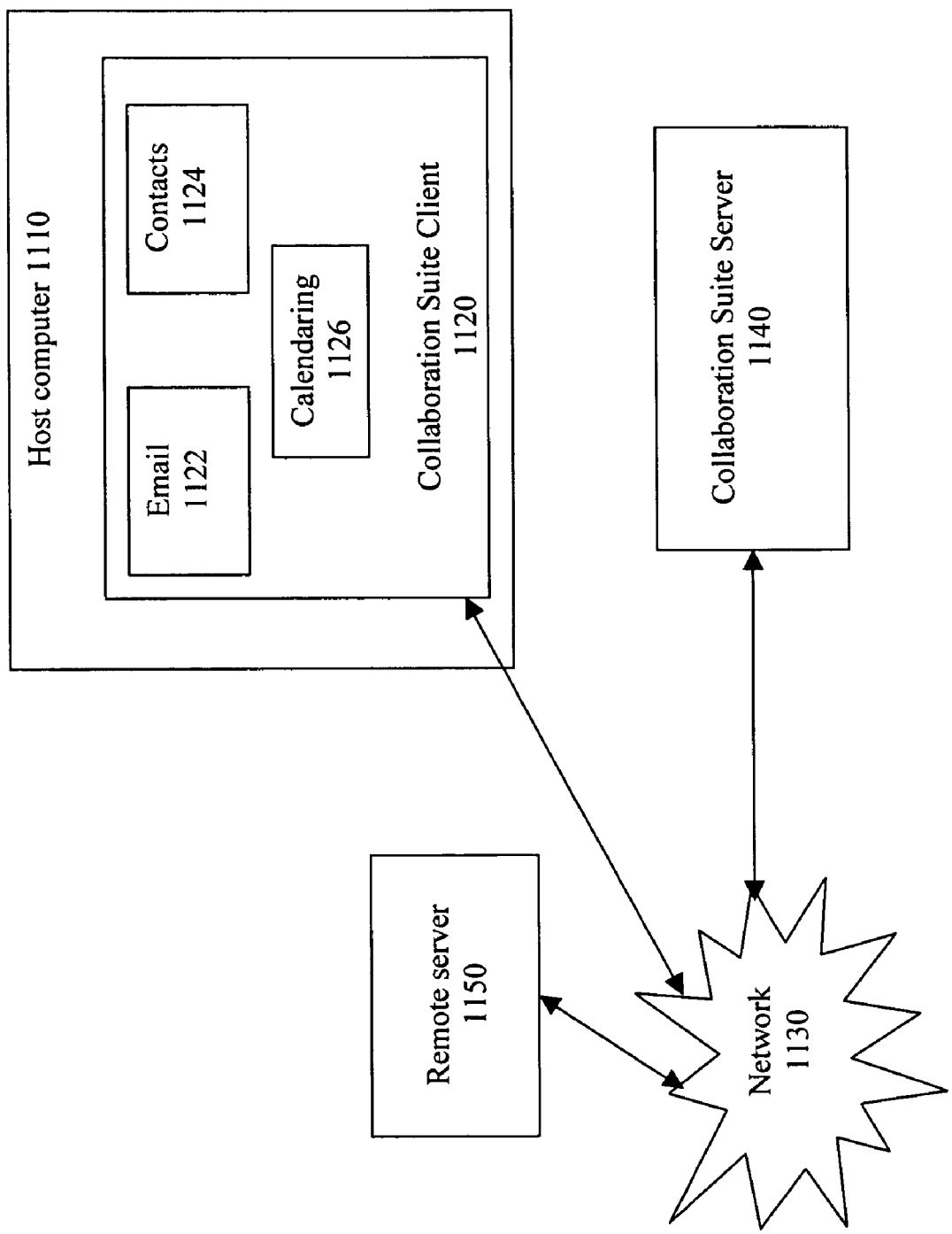
FIG. 11 is a block diagram of an example of a system that can implement embodiments of the present invention.

FIG. 11 is a block diagram of an example of a system that can implement embodiments of the present invention. A user's host computer 1110 has the collaboration suite client application 1120 on it. Through a network 1130, the user's host computer 1110 can communicate with a collaboration suite server 1140, as well as other remote servers 1150.

In one embodiment, the user's computer 1110 is a conventional computer system, that may include a CPU, a storage device, a network services connection 1130, and conventional input/output devices such as, a display, a mouse, a printer, and/or a keyboard, that may couple to a computer system. The computer also includes a conventional operating system, an input/output device, and network services software. Several of these components are not shown in FIG. 11 for purposes of clarity. The computer, the storage device, and the network services connection, may be available from, for example, IBM Corporation (Armonk, N.Y.), Sun Microsystems, Inc. (Palo Alto, Calif.), Hewlett-Packard, Inc. (Palo Alto, Calif.), or Apple (Cupertino, Calif.). In one embodiment, the user's host computer 1110 can be a Personal Digital Assistant (PDA), a cell phone, or any device with the appropriate computing abilities.

The user's computer 1110 includes several modules on it. One of the modules is the Collaboration Suite Client Application 1120. The Collaboration Suite Client Application 1120 includes an Email application 1122, a Contacts application 1124, and a Calendar application 1126. Some Collaboration Suite Clients 1120 include other modules such as a To-Do List application, a Memo application, and so on. Outlook from Microsoft Corp. (Redmond, Wash.), Zimbra Collaboration Suite from Zimbra, Inc. (San Mateo Calif.), and Lotus Notes from IBM (Armonk, N.Y.) are examples of Collaboration Suite Clients 1020. Several other application clients and/or other modules (e.g., network services connection) are also resident on the user's computer 1110, but are not shown in FIG. 11 for purposes of clarity.

The network 1130 can be any network, such as a Wide Area Network (WAN) or a Local Area Network (LAN), a home network, or any other network. Such a network may be wired, wireless, or any combination of these. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 1130 may also include commercially available subscription-based services such as, for example, AOL from America Online, Inc. (Dulles, Va.) or MSN from Microsoft Corporation (Redmond, Wash.).

The user's computer 1110 can communicate with the Collaboration Suite Server 1140, as well as any other remote servers 1150 through the network 1130.

In another system which can implement embodiments of the present invention, the collaboration suite client is actually downloaded into the browser, i.e. it is not typically installed on the host computer 1110 at all.

It is to be noted that the present invention is in no way limited to the system described, and that the systems discussed above are simply examples of systems that can implement embodiments of the present invention.

While particular embodiments and applications of the present invention have been illustrated and described, it is to be understood that the invention is not limited to the precise construction and components disclosed herein. For example, the specific screen shots and the options shown in the context menus, dialog boxes etc., as well as the types of interaction (e.g., right-click of a mouse, mousing over, etc.) are not limiting in any way. Further, other languages and/or protocols may be used to implement a system and method in accordance with the present invention. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A computer-implemented method for enhanced calendaring functionality in a collaboration suite application, the collaboration suite application comprising a plurality of elements, wherein one of the plurality of elements is a calendaring element, the method comprising:

displaying on a display associated with a computer a miniature calendar in a subsidiary view, with a second one of the plurality of elements of the collaboration suite application being displayed in a main view; and allowing a user to interact, using an input device, with entries in the calendaring element via the displayed miniature calendar on the display associated with the computer, without navigating away from the second one of the plurality of elements of the collaboration suite application displayed in the main view, wherein the interacting is via one of a group including a tool-tip, a button click, and a drag and drop.

2. The computer-implemented method of claim 1, wherein interacting with entries in the calendaring element comprises one of the group consisting of viewing, editing and adding appointments.

3. The computer-implemented method of claim 1, further comprising:

providing for interaction of a mailbox item in the main view with the miniature calendar.

4. The computer-implemented method of claim 3, wherein interaction comprises dragging the mailbox item over to a day displayed in the miniature calendar.

5. The computer-implemented method of claim 4, further comprising:

in response to the interaction, creating a meeting proposal based on the dragged mailbox item and the day in the miniature calendar to which it is dragged.

6. A computer-implemented method for enhanced calendaring functionality in a collaboration suite application, the method comprising:

providing, on a display associated with a computer, a view of multiple calendars simultaneously, each of the multiple calendars being divided into a plurality of timeslots and each of the multiple calendars having a name;

providing, on the display associated with the computer, a visual indicator to provide an indication of the cumulative availability of each of the plurality of timeslots across the multiple calendars, wherein the visual indicator is also divided into the plurality of timeslots, and wherein the visual indicator does not overlap with any of the multiple calendars;

receiving interaction with one of the plurality of timeslots in the visual indicator; and displaying in a tool-tip, on the display associated with the computer, the names of the ones of the multiple calendars which are not available for the one of the plurality of timeslots.

7. The computer-implemented method of claim 6 wherein the multiple calendars belong to different users.

* * * * *